(12) United States Patent
Aarnio et al.

(10) Patent No.: US 10,053,246 B2
(45) Date of Patent: Aug. 21, 2018

(54) MULTILAYER FILM

(75) Inventors: Minna Aarnio, Linz (AT); Gerhard Schuster, Engerwitzdorf (AT)

(73) Assignee: Borealis AG, Vienna (AT)

( * ) Notice: Subject to any disclaimer, the term of this patent is extended or adjusted under 35 U.S.C. 154(b) by 1005 days.

(21) Appl. No.: 13/814,661

(22) PCT Filed: Aug. 1, 2011

(86) PCT No.: PCT/EP2011/063180
§ 371 (c)(1),
(2), (4) Date: Mar. 20, 2013

(87) PCT Pub. No.: WO2012/016938
PCT Pub. Date: Feb. 9, 2012

(65) Prior Publication Data
US 2013/0167486 A1 Jul. 4, 2013

(30) Foreign Application Priority Data

Aug. 6, 2010 (EP) .................................. 10172102

(51) Int. Cl.
B65B 5/02 (2006.01)
B32B 7/02 (2006.01)
B32B 27/08 (2006.01)
B32B 27/32 (2006.01)

(52) U.S. Cl.
CPC .............. B65B 5/02 (2013.01); B32B 7/02 (2013.01); B32B 27/08 (2013.01); B32B 27/327 (2013.01); *B32B 2250/03* (2013.01); *B32B 2250/242* (2013.01); *B32B 2307/31* (2013.01); *B32B 2307/546* (2013.01); *B32B 2307/558* (2013.01); *B32B 2307/732* (2013.01); *B32B 2439/70* (2013.01); *B32B 2509/00* (2013.01); *B32B 2553/00* (2013.01); *B32B 2555/00* (2013.01); *Y10T 428/2495* (2015.01); *Y10T 428/24992* (2015.01); *Y10T 428/31913* (2015.04)

(58) Field of Classification Search
None
See application file for complete search history.

(56) References Cited

U.S. PATENT DOCUMENTS

2008/0057238 A1* 3/2008 Follestad ................. B32B 7/02
428/35.2

FOREIGN PATENT DOCUMENTS

| EP | 0129368 A1 | 12/1984 |
|---|---|---|
| EP | 0260130 A1 | 3/1988 |
| EP | 0423101 A2 | 4/1991 |
| EP | 0537130 A1 | 4/1993 |
| EP | 1108749 A1 | 6/2001 |
| EP | 1941999 A1 | 7/2008 |
| EP | 1961557 A1 | 8/2008 |
| EP | 2067799 A1 | 6/2009 |
| WO | WO97/28170 A1 | 8/1997 |
| WO | WO98/46616 A1 | 10/1998 |
| WO | WO98/49208 A1 | 11/1998 |
| WO | WO98/56831 A1 | 12/1998 |
| WO | WO99/12981 A1 | 3/1999 |
| WO | WO99/19335 A1 | 4/1999 |
| WO | WO00/34341 A2 | 6/2000 |
| WO | WO03/066698 A1 | 8/2003 |
| WO | WO2005/002744 A1 | 1/2005 |
| WO | WO2006/037603 A1 | 4/2006 |
| WO | WO2008/034630 A1 | 3/2008 |
| WO | WO2008/074493 A1 | 6/2008 |
| WO | WO2008/104371 A2 | 9/2008 |
| WO | WO2009/071323 A1 | 6/2009 |
| WO | WO2009/071324 A1 | 6/2009 |

OTHER PUBLICATIONS

International Search Report and Written Opinion for Application No. PCT/EP2011/063180 dated Nov. 2, 2011.

* cited by examiner

*Primary Examiner* — Ronak C Patel
(74) *Attorney, Agent, or Firm* — Meunier Carlin & Curfman LLC

(57) ABSTRACT

Multilayer film which comprises a core layer (C) and two outer layers (O—, O-2) sandwiching the core layer, wherein (i) the core layer (C) comprises a bimodal ethylene/1-butene/$C_6$-$C_{12}$-alpha-olefin terpolymer, (ii) one outer layer (O-1) comprising (ii-1) a low density polyethylene or (ii-2) the bimodal terpolymer as defined for the core layer (C) or (ii-3) a metallocene produced linear low density polyethylene and optionally a low density polyethylene (iii) the other outer layer (O-2) comprising (iii-1) a metallocene produced linear low density polyethylene and optionally a low density polyethylene, and its use for packaging, especially for frozen food packaging.

8 Claims, No Drawings

MULTILAYER FILM

FIELD OF THE INVENTION

The present invention is related to a multilayer film with excellent mechanical properties, especially stiffness and toughness, as well as processability, suitable for packaging which may be prepared by co-extrusion processes.

In particular, the invention concerns a multilayer film comprising at least one layer of a multimodal terpolymer, e.g. a bimodal linear low density ethylene/1-butene/$C_6$-$C_{12}$-alpha-olefin terpolymer.

The invention is further directed to the use of such multilayer films in packaging, preferably in flexible packaging, especially in frozen food packaging.

DESCRIPTION OF PRIOR ART

Several types of films are used today. Mono-films, mainly blends of e.g. ethylene vinyl acetate (EVA) or low density polyethylene (LDPE) with linear low density polyethylene (LLDPE), still dominate in volume sold to this market. Co-extruded films, in particular 3- or more-layer films, with tailor-made combinations deliver functional properties, down-gauging and mechanical flexibility and are increasingly replacing mono-films.

The packaging industries still represent a strong need for economical, effective and innovative packaging solutions.

Polymer film manufacturers therefore seek films which have excellent mechanical properties, e.g. high impact strength, tear strength, puncture resistance, toughness and stiffness. The polymers used to make the film must also have good processability, i.e. during the extrusion procedure the bubble formed must be stable and the extruded film should have an even film thickness distribution.

Unfortunately art skilled persons are faced with the problem that when improving one property it seems inevitable that another property is adversely affected.

For example, low density polyethylene (LDPE) gives rise to films having good optical properties and can be processed at low temperatures and pressures whilst maintaining melt strength and excellent processability however films made from LDPE contribute little to mechanical properties.

Conventional unimodal Ziegler-Natta produced linear low density polyethylenes (znLLDPE's) have moderate mechanical properties but not so remarkable processability, meaning both bubble stability and extrusion pressure.

Optical properties and puncture resistance have been improved by using metallocene linear low density polyethylenes but even more at the expense of processability. These polymers are sensitive for film processing conditions and lack melt strength.

Various blends of these materials have been proposed in the art to try to maximise film performance by combining the advantageous properties of certain polymers. Thus for example, LDPE and mLLDPE have been blended to form films however such films have poor stiffness. Medium density polyethylene made by metallocene catalysis has been blended with LDPE (EP-A-1108749) to form films.

A great variety of multilayer films have also been disclosed which should solve the above problems of non-satisfactory balance of mechanical properties, especially stiffness and toughness, and processability.

For example WO 2008/104371 discloses multilayer film laminate which comprises a multilayer film with, in the given layer order, an inner layer (A), a core layer (B) and an outer layer (C), which is laminated to a substrate.

The inner layer (A) comprises a multimodal polyethylene composition, i.e. a bimodal linear low density polyethylene (LLDPE), having a density of 940 kg/m3 or less and molecular weight distribution Mw/Mn of at least 8 and a MFR2 of 0.01 to 20 g/10 min when determined according to ISO 1133 (at 190° C. and 2.16 kg load).

Preferably, the LLDPE comprises an ethylene hexene copolymer, ethylene octene copolymer or ethylene butene copolymer.

Layer (C) comprises LLDPE which can be unimodal or multimodal LLDPE. Moreover, the LLDPE can be znLLDPE or the LLDPE can be obtainable by polymerisation using a single site catalyst (mLLDPE). Both mLLDPE and znLLDPE alternatives are preferable. Also preferably, layer (C) may comprise low-density polyethylene (LDPE) homo- or copolymer composition obtainable by high-pressure polymerisation.

Layer (B) can comprise or consists of the same polymer composition as comprised or consisted of in layer (A) or layer (C).

Borstar® FB2310 or Borstar® FB2230 as commercial grades of LLDPE's are given as examples as feasible multimodal LLDPE grades for at least layer (A) and, if present, for optional layer(s), such as layer (B).

WO 2008/074493 discloses a uniaxially oriented multilayer film comprising at least a layer (A) and a layer (B), wherein said layer (A) comprises a linear low density polyethylene (LLDPE) comprising (e.g. selected from):
  a multimodal LLDPE produced using a Ziegler Natta catalyst (znLLDPE), or
  a LLDPE produced using a single site catalyst (mLLDPE) or
  a mixture of a mLLDPE and a multimodal znLLDPE, said layer (B) comprises a multimodal LLDPE, and said multilayer film is in the form of a stretched film which is uniaxially oriented in the machine direction (MD) in a draw ratio of at least 1:3.

Layer (A) of embodiment (i) may optionally comprise one or more additional polymer components other than LLDPE, such as a medium density polyethylene (MDPE), a high density polyethylene (HDPE), both produced in low pressure polymerisation, or a low density polyethylene (LDPE) produced in high pressure polymerisation, such as LDPE homopolymer or LDPE copolymer, such as ethylene acrylate copolymer.

In one particularly preferred embodiment (ii) of the invention, a layer (A) comprises, more preferably consists of, mLLDPE and LDPE.

Layer (B) preferably comprises at least 50 wt %, preferably at least 60 wt %, more preferably at least 70 wt % of a multimodal LLDPE. In some embodiments even about 80 wt % or more of multimodal LLDPE is preferred. Multimodal LLDPE is preferably a multimodal znLLDPE composition.

The film may further comprise (iii) a layer (C). Said layer (C), when present, preferably has a polymer composition as described in relation to layer (A) above.

The LLDPE used for layer (B), preferably a multimodal znLLDPE, preferably comprises an ethylene hexene copolymer, ethylene octene copolymer or ethylene butene copolymer.

WO 2006/037603 discloses a 3-layer structure, wherein the outer layers comprise LLDPE, preferably unimodal LLDPE, especially unimodal mLLDPE. The LLDPE is preferably a $C_2$/$C_6$-copolymer. One or both outer layers may contain LDPE.

It is further disclosed that a specific film may comprise a first outer layer comprising a unimodal LLDPE and LDPE blend with the other outer layer being formed from multimodal LLDPE optionally combined with an LDPE component.

The core layer comprises a multimodal polyethylene component having a lower molecular weight component and a higher molecular weight component, i.e. a multimodal LLDPE.

Thus, the multimodal PE comprises a higher molecular weight component which preferably corresponds to an ethylene copolymer and a lower molecular weight component which corresponds to an ethylene homopolymer or copolymer. Such 3-layer films are especially suitable for producing pouches.

However, although much development work has already been done in the field of multilayer films suitable for different kinds of packaging, the films as disclosed in the prior art still do not provide a sufficient balance of processability and stiffness in combination with high toughness, so that there exists a need for novel and improved film structures, providing films with excellent processability and stiffness in combination with excellent toughness required for certain end applications, especially for frozen food packaging.

SUMMARY OF THE INVENTION

It is an object of the present invention to provide a multilayer film which provides excellent processability and stiffness in combination with excellent toughness, thus being especially suitable for frozen food packaging.

It has surprisingly been found that a multilayer film comprising three layers, with at least one layer, preferably the core layer, comprising a bimodal linear low density terpolymer, can fulfil these requirements.

Thus the present invention provides a multilayer film which comprises a core layer (C) and two outer layers (O-1, O-2) sandwiching the core layer, wherein
(i) the core layer (C) comprises a bimodal ethylene/1-butene/$C_6$-$C_{12}$-alpha-olefin terpolymer,
(ii) one outer layer (O-1) comprising
  (ii-1) a low density polyethylene or
  (ii-2) a bimodal terpolymer as defined for the core layer (C) or
  (ii-3) a metallocene produced linear low density polyethylene and optionally a low density polyethylene
(iii) the other outer layer (O-2) comprising
  (iii-1) a metallocene produced linear low density polyethylene and optionally a low density polyethylene

DETAILED DESCRIPTION OF THE INVENTION

The multilayer film according to the present invention comprises two outer layers and a core layer, which is sandwiched between the two outer layers and is purely polyethylene based.
Core Layer The core layer (C) comprises a bimodal ethylene/1-butene/$C_6$-$C_{12}$-alpha-olefin terpolymer.

Suitable terpolymers can comprise
(A-1) a low molecular weight homopolymer of ethylene and
(A-2) a high molecular weight terpolymer of ethylene, 1-butene and a $C_6$-$C_{12}$-alpha-olefin or
(B-1) a low molecular weight copolymer of ethylene and 1-butene or a $C_6$-$C_{12}$-alpha olefin and
(B-2) a high molecular weight copolymer of ethylene and 1-butene, if the low molecular weight polymer of (B-1) is a copolymer of ethylene and a $C_6$-$C_{12}$-alpha olefin, or a terpolymer of ethylene, 1-butene and a $C_6$-$C_{12}$-alpha olefin.

The polyethylene component in this core layer must be bimodal, i.e. its molecular weight profile does not comprise a single peak but instead comprises the combination of two peaks (which may or may not be distinguishable) centred about different average molecular weights as a result of the fact that the polymer comprises two separately produced components.

Multimodal polyethylenes are typically made in more than one reactor each having different conditions. The components are typically so different that they show more than one peak or shoulder in the diagram usually given as result of its GPC (gel permeation chromatograph) curve, where $d(\log(MW))$ is plotted as ordinate vs $\log(MW)$, where MW is molecular weight.

Thus, the multimodal polyethylene comprises a high molecular weight component which corresponds to an ethylene terpolymer of higher alpha-olefin comonomers and a low molecular weight component which corresponds to an ethylene homopolymer or a low molecular weight component which corresponds to an ethylene copolymer and a high molecular weight ethylene-butene copolymer, if the low molecular weight polymer is a copolymer of ethylene and a $C_6$-$C_{12}$-alpha-olefin, or a terpolymer.

Preferably the higher alpha-olefin comonomers are $C_6$-$C_{12}$-alpha-olefins selected from the group of 1-hexene, 4-methyl-1-pentene, 1-octene and 1-decene.

More preferably the polyethylene in the core layer is formed from an ethylene homopolymer and an ethylene butene/hexene terpolymer or ethylene butene/octene terpolymer.

Such bimodal polymers may be prepared for example by two stage polymerisation or by the use of two different polymerisation catalysts in a one stage polymerisation. It is also possible to employ a dualsite catalyst. It is important to ensure that the higher and lower molecular weight components are intimately mixed prior to extrusion to form a film. This is most advantageously achieved by using a multistage process or a dual site but could be achieved through blending.

To maximise homogeneity, particularly when a blend is employed, it is preferred if the multimodal polyethylene used in the core layer is extruded prior to being extruded to form the film of the invention. This pre-extrusion step ensures that the higher molecular weight component will be homogeneously distributed though the core layer and minimises the possibility of gel formation in the film.

Preferably the multimodal polyethylene is produced in a multi-stage polymerisation using the same catalyst, e.g. a metallocene catalyst or preferably a Ziegler-Natta catalyst. Thus, two slurry reactors or two gas phase reactors could be employed. Preferably however, the multimodal polyethylene is made using a slurry polymerisation in a loop reactor followed by a gas phase polymerisation in a gas phase reactor.

A loop reactor-gas phase reactor system is marketed by Borealis A/S, Denmark as a BORSTAR reactor system. The multimodal polyethylene in the core layer is thus preferably formed in a two stage process comprising a first slurry loop polymerisation followed by gas phase polymerisation in the presence of a Ziegler-Natta catalyst.

The conditions used in such a process are well known. For slurry reactors, the reaction temperature will generally be in the range 60 to 110° C. (e.g. 85-110° C.), the reactor pressure will generally be in the range 5 to 80 bar (e.g. 50-65 bar), and the residence time will generally be in the range 0.3 to 5 hours (e.g. 0.5 to 2 hours). The diluent used will generally be an aliphatic hydrocarbon having a boiling point in the range −70 to +100° C. In such reactors, polymerisation may if desired be effected under supercritical conditions. Slurry polymerisation may also be carried out in bulk where the reaction medium is formed from the monomer being polymerised.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

Preferably, the low molecular weight polymer fraction is produced in a continuously operating loop reactor where ethylene is polymerised in the presence of a polymerisation catalyst as stated above and a chain transfer agent such as hydrogen. The diluent is typically an inert aliphatic hydrocarbon, preferably isobutane or propane.

The high molecular weight component can then be formed in a gas phase reactor using the same catalyst.

Where the higher molecular weight component is made as a second step in a multistage polymerisation it is not possible to measure its properties directly. However, e.g. for the above described polymerisation process of the present invention, the density, $MFR_2$ etc of the HMW component can be calculated using Kim McAuley's equations.

Thus, both density and $MFR_2$ can be found using K. K. McAuley and J. F. McGregor: On-line Inference of Polymer Properties in an Industrial Polyethylene Reactor, AlChE Journal, June 1991, Vol. 37, No, 6, pages 825-835. The density is calculated from McAuley's equation 37, where final density and density after the first reactor is known. $MFR_2$ is calculated from McAuley's equation 25, where final $MFR_2$ and $MFR_2$ after the first reactor are calculated.

The bimodal terpolymer used according to the invention comprises in one embodiment a low molecular weight fraction (LMW) of a homopolymer of ethylene and a high molecular weight fraction (HMW) of a terpolymer of ethylene, 1-butene and a $C_6$-$C_{12}$-alpha-olefin and in another embodiment a low molecular weight fraction (LMW) of a copolymer of ethylene and 1-butene or a $C_6$-$C_{12}$-alpha-olefin, and a high molecular weight fraction which is a copolymer of ethylene and 1-butene, if the low molecular weight polymer is a copolymer of ethylene and a $C_6$-$C_{12}$-alpha olefin, or a terpolymer of ethylene, 1-butene and a $C_6$-$C_{12}$-alpha-olefin.

The expression "homopolymer of ethylene" used herein refers to a polyethylene that consists substantially, i.e. to at least 98% by weight, preferably at least 99% by weight, more preferably at least 99.5% by weight, most preferably at least 99.8% by weight of ethylene.

As stated above the higher alpha-olefin comonomers are preferably $C_6$-$C_{12}$-alpha-olefins selected from the group of 1-hexene, 4-methyl-1-pentene, 1-octene and 1-decene. More preferably 1-hexene or 1-octene, most preferably 1-hexene is used as second comonomer beside 1-butene.

Such bimodal terpolymers are known in the state of the art and are described e.g. in WO 03/066698 or WO 2008/034630.

Thus suitable terpolymers can comprise:
a) in a first embodiment a low molecular weight fraction (LMW) of a homopolymer of ethylene or a binary copolymer of ethylene and a 1-butene or a $C_6$-$C_{12}$-alpha-olefin and a high molecular weight fraction (HMW) of a binary copolymer of ethylene and 1-butene, if the low molecular weight polymer of a) is a binary copolymer of ethylene and a $C_6$-$C_{12}$-alpha-olefin, or a terpolymer of ethylene, 1-butene and a $C_6$-$C_{12}$-alpha-olefin.

Preferably the bimodal terpolymer according to this first embodiment comprises:

A low molecular weight fraction (LMW) of a homopolymer of ethylene or a binary copolymer of ethylene and a 1-butene and a high molecular weight fraction (HMW) of a terpolymer of ethylene, 1-butene and a $C_6$-$C_{12}$-alpha-olefin.

The weight average molecular weight of such a bimodal terpolymer according to the first embodiment is preferably between 80 000 to 400 000 g/mol, more preferably between 100 000 to 300 000 g/mol. The low molecular weight polymer fraction has a weight average molecular weight preferably of 4 500 to 55 000 g/mol, more preferably of 5 000 to 50 000 g/mol and the high molecular weight polymer has a weight average molecular weight preferably of 150 000 to 1 000 000 g/mol, more preferably of 200 000 to 800 000 g/mol.

The molecular weight distribution of the polymer is further characterized by the way of its melt flow rate (MFR) according to ISO 1133 at 190° C. The melt flow rate is preliminary depending on the mean molecular weight. This is, because long, well-packed molecules give the material a lower flow tendency than short, less-packed molecules.

An increase in molecular weight means a decrease in MFR value. The melt flow rate is measured in g/10 min of the polymer discharge under a specified temperature and pressure condition and is a measure of the viscosity of the polymer, which in turn for each type of polymer is mainly influenced by its molecular weight distribution, but also by its degree of branching etc. The melt flow rate measured under a load 2.16 kg (ISO 1133) is denoted as $MFR_2$. In turn, the melt flow rate measured with 21.6 kg is denoted as $MFR_{21}$.

The final bimodal terpolymer according to the first embodiment has a melt flow rate $MFR_{21}$, preferably of 7 to 60 g/10 min, more preferably of 10 to 50 g/10 min and most preferably 15 to 45 g/10 min.

The low molecular weight polymer has a melt index $MFR_2$, preferably of 200 to 800 g/10 min, more preferably of 300 to 600 g/10 min.

The density of the final bimodal terpolymer according to the first embodiment is preferably of 910 to 950 kg/m³, more preferably of 915 to 940 kg/m³.

The density of the low molecular weight polymer is preferably 940 to 980 kg/m³, more preferably 945 to 975 kg/m³.

The amount of the low molecular weight copolymer in the bimodal terpolymer is in the range of 30 to 60 wt %, preferably 35 to 50 wt % and most preferably 38 to 45 wt %.

The overall comonomer content in the bimodal terpolymer according to the first embodiment is 1 to 7% by mol, preferably 2 to 6% by mol and in the low molecular weight polymer is the comonomer content 0 to 2.5% by mol, preferably 0 to 2% by mol. In the high molecular weight polymer is the comonomer content 2.5 to 11% by mol, preferably 3 to 10% by mol.

Further, the molecular weight of the high molecular weight copolymer fraction should be such that when the low molecular weight copolymer fraction has the melt index and density specified above, the final bimodal terpolymer has the melt index and density as discussed above.

b) in a second embodiment a low molecular weight homopolymer of ethylene and a high molecular weight terpolymer of ethylene, 1-butene and a $C_6$-$C_{12}$-alpha-olefin.

The weight average molecular weight of the bimodal terpolymer according to the second embodiment is between 100 000 to 500 000 g/mol, preferably 200 000 to 400 000 g/mol. The low molecular weight polymer fraction has a weight average molecular weight preferably of 4 500 to 55 000 g/mol, more preferably of 5 000 to 50 000 g/mol and the high molecular weight polymer has a weight average molecular weight preferably of 200 000 to 1 000 000 g/mol, more preferably of 300 000 to 800 000 g/mol.

The final bimodal terpolymer according to the second embodiment has a melt flow rate $MFR_{21}$, preferably of 2 to 35 g/10 min, more preferably of 3 to 30 g/10 min. The low molecular weight polymer has a melt index $MFR_2$ preferably of 300 to 1 200 g/10 min, more preferably of 300 to 600 g/10 min.

The density of the final bimodal terpolymer according to the second embodiment is preferably of 935 to 970 kg/m³, more preferably of 940 to 965 kg/m³. The density of the low molecular weight polymer is preferably of 970 to 980 kg/m³, more preferably of 972 to 978 kg/m³, most preferably 975 kg/m³.

The amount of the low molecular weight copolymer in the bimodal terpolymer according is in the range of 30 to 60 wt %, more preferably 35 to 50 wt % and most preferably 38 to 45 wt %.

The overall comonomer content in the total polymer is 0.3 to 3.0% by mol, preferably 0.5 to 2.5% by mol and in the high molecular weight polymer is the comonomer content 0.5 to 3.5% by mol, preferably 0.7 to 3.0% by mol.

Further, the molecular weight of the high molecular weight copolymer fraction should be such that when the low molecular weight copolymer fraction has the melt index and density specified above, the final bimodal terpolymer has the melt index and density as discussed above.

c) in a third embodiment a low molecular weight fraction (LMW) of a binary copolymer of ethylene and a 1-butene or a $C_6$-$C_{12}$ alpha-olefin and a high molecular weight fraction (HMW) of a binary copolymer of ethylene and 1-butene if the low molecular weight polymer is a binary copolymer of ethylene and a $C_6$-$C_{12}$ alpha-olefin, or a terpolymer of ethylene, 1-butene and a $C_6$-$C_{12}$ alpha-olefin.

The weight average molecular weight of the bimodal terpolymer according to the third embodiment is between 110 000 to 210 000 g/mol, preferably 120 000 to 200 000 g/mol. The low molecular weight polymer fraction has a weight average molecular weight preferably of 25 000 to 110 000 g/mol, more preferably of 30 000 to 100 000 g/mol and the high molecular weight polymer has a weight average molecular weight preferably of 100 000 to 400 000 g/mol, more preferably of 150 000 to 370 000 g/mol.

The final bimodal terpolymer according to the third embodiment has a melt flow rate $MFR_{21}$ preferably of 15 to 80 g/10 min, more preferably of 20 to 70 g/10 min. The low molecular weight polymer has a melt index $MFR_2$ preferably of 1 to 50 g/10 min, more preferably of 2 to 20 g/10 min.

The density of the final bimodal terpolymer according to the third embodiment is preferably of 900 to 935 kg/m³, more preferably of 915 to 930 kg/m³ and in particular 920 to 925 kg/m³. The density of the low molecular weight polymer is preferably of 925 to 950 kg/m³, more preferably of 930 to 940 kg/m³.

The amount of the low molecular weight copolymer in the bimodal terpolymer according to the third embodiment is in the range of 30 to 60 wt %, more preferably 35 to 50 wt % and most preferably 38 to 45 wt %.

The overall comonomer content in the total polymer according to the third embodiment is 1 to 7% by mol, preferably 2 to 6% by mol and in the low molecular weight polymer is the comonomer content 0.5 to 3.5% by mol, preferably 1 to 3% by mol. In the high molecular weight polymer is the comonomer content 3.5 to 10.5% by mol, preferably 4 to 10% by mol.

Further, the molecular weight of the high molecular weight copolymer fraction should be such that when the low molecular weight copolymer fraction has the melt index and density specified above, the final bimodal terpolymer has the melt index and density as discussed above.

In addition to the bimodal terpolymer of all three described embodiments the composition may also contain antioxidants, process stabilizers, pigments, UV-stabilizers and other additives known in the art.

Examples of stabilizers are hindered phenols, hindered amines, phosphates, phosphites and phosphonites.

Examples of pigments are carbon black, ultra marine blue and titanium dioxide.

Examples of other additives are e.g. clay, talc, calcium carbonate, calcium stearate, zinc stearate and antistatic additives like.

Sandwiching Layers

As identified above, the three-layer structure in accordance with the present invention comprises in addition to the core layer two layers sandwiching the core layer The layers sandwiching the core layer are layers directly contacting the core layer, preferably without any adhesive layer or surface treatment applied.

The two outer layers which are sandwiching the core layer can comprise (ii) one outer layer (O-1) comprising
  (ii-1) a low density polyethylene or
  (ii-2) a bimodal terpolymer as defined for the core layer (C) or
  (ii-3) a metallocene produced linear low density polyethylene optionally in combination with a low density polyethylene (iii) the other outer layer (O-2) comprising
  (iii-1) a metallocene produced linear low density polyethylene optionally in combination with a low density polyethylene One outer layer (O-1) can comprise according to embodiment (ii-2) a bimodal terpolymer as defined and described above for the core layer (C).

Otherwise the outer layer O-1 can comprise according to embodiment (ii-1) a low density polyethylene (LDPE).

LDPE means herein a low-density ethylene homopolymer produced in high-pressure polymerization process.

Such LDPEs are well known in the art and they typically contain long chain branching which differentiates LDPEs from linear low-density polyethylenes, LLDPEs.

LDPE usable in the layer(s) of present invention is in principal not limited. LDPE may typically have a $MFR_2$ of at least 0.05 g/10 min, preferably in the range 0.1-20 g/10 min, more preferably 0.3-10 g/10 min, still more preferably 0.4-5 g/10 min. In one embodiment, LDPE with $MFR_2$ of 0.2 to 1.0 g/10 min is preferred. The density of the LDPE is typically 905-940 kg/m³, preferably 910 to 935 kg/m³, e.g. 915 to 930 kg/m³. The Vicat softening temperature of LDPE is preferably 60-200° C., more preferably 80-150° C., e.g. about 90-110° C. The Tm of the LDPE is preferably 70-180° C., more preferably 90-140° C., e.g. about 110-120° C.

LDPEs suitable for three-layer film structures are any conventional LDPEs, e.g. commercially known LDPEs, or they may be prepared according to any conventional high-pressure polymerisation (HP) process in a tubular or autoclave reactor using a free radical formation. Such HP processes are very well known in the field of polymer chemistry and described in the literature, see e.g. Vieweg, Schely and Schwarz: Kunstoff Handbuch, Band IV, Polyolefins, Carl Hanser Verlag (1969), pages 39-51. Typical pressures are from 1000 to 3000 bar. The polymerization temperature is preferably 150-350° C. The free radical initiators are commonly known, e.g. organic peroxide based initiators.

Suitable LDPE's are available commercially from Borealis, Basell, Exxon, Sabic, or other suppliers.

Furthermore the outer layer (O-1) can comprises
(ii-3) a metallocene produced linear low density polyethylene (LLDPE) optionally in combination with a low density polyethylene.

Thus, said outer layer (O-1) can comprise LLDPE which can be unimodal or multimodal LLDPE. The possibility of using mixtures of LLDPE's is also covered, e.g. a unimodal LLDPE and a bimodal LLDPE.

Moreover the LLDPE suitable for outer layer (O-1) is obtained by producing a single site, e.g. metallocene, catalyst (mLLDPE).

As used herein, the mLLDPE polymer is an ethylene copolymer having a density of 940 kg/m³ or less. Preferred mLLDPE's may have a density of 905 to 940 kg/m³, more preferably 910 to 937 kg/m. In one preferable embodiment even densities of 915 to 925 kg/m³ are highly feasible.

The mLLDPE is formed from ethylene along with at least one $C_3$-$C_{20}$-alpha-olefin comonomer, preferably $C_3$-$C_{12}$-alpha-olefin comonomer, e.g. 1-butene, 1-hexene or 1-octene. Preferably, the mLLDPE is a binary copolymer, i.e. the polymer contains ethylene and one comonomer, or a terpolymer, i.e. the polymer contains ethylene and two or three, preferably two, comonomers. Preferably, the mLLDPE comprises an ethylene-hexene copolymer, ethylene-octene copolymer, ethylene-butene copolymer or a terpolymer of ethylene with 1-butene and 1-hexene comonomers. The amount of comonomer present in the mLLDPE is preferably 0.5 to 12 mol %, more preferably 2 to 10 mol %, and most preferably 4 to 8 mol %.

Alternatively, comonomer contents present in the mLLDPE may be 1.5 to 10 wt %, especially 2 to 8 wt %.

The $MFR_2$ of mLLDPE's is preferably in the 0.01 to 20 g/10 min, more preferably 0.2 to 10 g/10 min, even more preferably 0.3 to 6.0 g/10 min, and most preferably 0.4 to 4.0 g/10 min.

The mLLDPE has preferably a weight average molecular weight (Mw) of 100 000 to 250 000 kg/mol, more preferably 110 000 to 160 000 kg/mol.

The mLLDPE may be unimodal or multimodal, both are preferable. By unimodal is meant that the molecular weight profile of the polymer comprises a single peak and is produced by one reactor and one catalyst.

The unimodal mLLDPE polymers preferably posses a narrow molecular weight distribution. The Mw/Mn value is preferably 2 to 4, more preferably 2 to 3.

Multimodal can be understood as bimodal MWD or bimodal comonomer distribution (e.g. the MFR's of the components are the same, but they contain same comonomer in different amounts). Bimodal mLLDPE comprise a LMW component and a HMW component.

Both the LMW and HMW components of multimodal mLLDPE are preferably copolymers of ethylene as defined above.

The molecular weight distribution, Mw/Mn, of a multimodal mLLDPE may be below 30, preferably in the range of 2-5.

The outer layer (O-1) may comprise at least 50 wt %, preferably at least 60 wt %, more preferably at least 75 wt % and most preferably at least 80 wt % up to 100 wt % of the mLLDPE as described above.

Suitable LLDPE's are available commercially from ExxonMobil Chemical, Nova, Dow, Basell, to mention a few.

Alternatively, suitable LLDPE polymers can be produced in a known manner according to or analogously to conventional polymerisation processes, including solution, slurry and gas phase processes, described in the literature of polymer chemistry.

Unimodal mLLDPE, as defined above is preferably prepared using a single stage polymerisation, e.g. solution, slurry or gas phase polymerisation, preferably a slurry polymerisation in slurry tank or, more preferably, in loop reactor in a manner well known in the art. As an example, said unimodal LLDPE can be produced e.g. in a single stage loop polymerisation process according to the principles given below for the polymerisation of low molecular weight fraction in a loop reactor of a multistage process, naturally with the exception that the process conditions (e.g. hydrogen and comonomer feed) are adjusted to provide the properties of the final unimodal polymer.

Multimodal (e.g. bimodal) LLDPE as defined above can be made by blending mechanically two or more separately prepared polymer components, or preferably, by in situ blending in a multistage polymerisation process during the preparation process of the polymer components. Both mechanical and in situ blending is well known in the field.

Accordingly, preferred multimodal LLDPE polymers are obtainable by in-situ blending in a multistage, i.e. two or more stage, polymerization process including solution, slurry and gas phase process, in any order. Alternatively said multimodal LLDPE may be obtainable by using two or more different polymerization catalysts, including multi- or dual site catalysts, in a one-stage polymerization.

Preferably the multimodal LLDPE as defined above is produced in at least two-stage polymerization using the same catalyst, e.g. a single site catalyst. Thus, for example two slurry reactors or two gas phase reactors, or any combinations thereof, in any order can be employed.

LLDPE as defined above may be made using any conventional single site catalysts (SSC), which SSC catalysts include metallocenes.

All these catalysts are well known in the field. In case of mLLDPE, metallocene catalysis is preferably used herein. The preparation of the metallocene catalyst can be carried out according or analogously to the methods known from the literature and is within skills of a person skilled in the field. Thus for the preparation see e.g. EP-A-129 368, WO-A-9856831, WO-A-0034341, EP-A-260 130, WO-A-9728170, WO-A-9846616, WO-A-9849208, WO-A-9912981, WO-A-9919335, WO-A-9856831, WO-A-00/34341, EP-A-423 101 and EP-A-537 130. WO2005/002744 describes a preferable catalyst and process for preparing said mLLDPE component.

The outer layer (O-1) optionally comprises also a LDPE component in addition to the mLLDPE.

The LDPE used for the outer layer (O-1) is defined as for embodiment (ii-1) of the outer layer (O-1).

The amount of LDPE present is 0 wt % up to 50% wt, preferably up to 25% by weight, more preferably up to 20 wt % of the outer layer (O-1).

Thus the amount of mLLDPE usable in layer (O-1) typically varies between 50 to 100 wt % of the total amount of layer (O-1). If layer (O-1) comprises a blend of mLLDPE and LDPE, the amount of LDPE can vary between 1 to 50 wt %. Preferably the blend comprises 5 to 35 wt % of LDPE and 65 to 95 wt % of mLLDPE.

The other outer layer (O-2) comprises
(iii-1) a metallocene produced linear low density polyethylene (LLDPE) optionally in combination with a low density polyethylene.

Suitable mLLDPE and LDPE are the same as for outer layer (O-1) and are described above for outer layer (O-1).

The outer layers (O-1) and (O-2) may be the same, thus both comprising a metallocene produced linear low density polyethylene (LLDPE) optionally in combination with a low density polyethylene, or can be different.

A specific film thus may comprise a first outer layer (O-1) comprising LDPE and the other outer layer (O-2) being formed from a unimodal LLDPE and LDPE blend or a first outer layer (O-1) comprising a bimodal terpolymer and the other outer layer (O-2) being formed from a unimodal LLDPE and LDPE blend.

A further specific film may comprise a first outer layer (O-1) comprising multimodal mLLDPE or a unimodal LLDPE and LDPE blend and the outer layer (O-2) also being formed from multimodal mLLDPE or a unimodal LLDPE and LDPE blend.

The outer layers may also contain other polymer components if necessary and may also contain minor amounts of conventional additives such as antioxidants, UV stabilisers, acid scavengers, nucleating agents, anti-blocking agents, slip agents etc as well as polymer processing agent (PPA). Polymer processing agents are available from commercial suppliers such as Dynamar and may include a fluoroelastomer component and can be added to the outer layer blend as part of a masterbatch as is known in the art.

Three-Layer Structure

The films of the invention may have a thickness of 10 to 250 microns, preferably 20 to 200 microns, and more preferably 30 to 150 microns.

The outer layers and core layer may all be of equal thickness or alternatively the core layer may be thicker than each outer layer. A convenient film comprises two outer layers which each form 10 to 35%, preferably 15 to 30% of the total thickness of the 3-layered film, the core layer forming the remaining thickness, e.g. 30 to 80%, preferably 40 to 70% of the total thickness of the 3-layered film.

The three-layer structure in accordance with the present invention may be prepared by any conventional film extrusion procedure known in the art including cast film and blown film extrusion. Preferably, the three-layer film is formed by blown film extrusion, more preferably by coextrusion processes, which in principle are known and available to the skilled person.

Typical processes for preparing a three-layer structure in accordance with the present invention are extrusion processes through an angular die, followed by blowing into a tubular film by forming a bubble which is collapsed between the rollers after solidification. This film can then be slid, cut or converted, such as by using a gazette head, as desired. Conventional film production techniques may be used in this regard. Typically the core layer mixture and the mixture for the sandwiching layers are coextruded at a temperature in the range of from 160 to 240° C. and cooled by blowing gas (generally air) at a temperature of 10 to 50° C., to provide a frost line height of 1 or 2 to 8 times the diameter of the dye. The blow up ratio should generally be in the range of from 1.5 to 4, such as from 2 to 4, preferably 2.5 to 3.

If desired any of the three layers of the three-layered structure of the invention may comprise usual additives, such as stabilizers, processing aids, colorants, anti-block agents, slip agents etc. in amounts not detrimental to the desired function of the three-layered structure. Typically the overall amount of additives in a layer is 7 wt % or less, based on the weight of the layer, preferably 5 wt % or less, more preferably 3 wt % or less. In embodiments the layers can be completely free of any additives.

The three-layer structure as identified in the present invention surprisingly displays an excellent balance of processability and stiffness in combination with improved toughness.

The three-layer structure as identified in the present invention especially exhibits high impact strengths in a broad temperature range.

Thus for a 40 micron film of the invention, Dart drop F50 (ISO 7765/1) may be at least 300 g, preferably at least 350 g.

Furthermore the relate total penetration energy for a 40 micron film of the invention according to ISO 7765-2 at +23° C. is at least 18 J/mm, preferably at least 20 J/mm and more preferably at least 22 J/mm; at −20° C. at least 15 J/mm, preferably at least 16.5 J/mm and at −40° C. at least 15 J/mm.

The films of the invention have a wide variety of applications but are of particular interest in packaging.

For such packaging purposes, the three-layer structure in accordance with the present invention may be laminated with additional films, including resin films, metal foils etc., depending upon the desired end application.

The additional optional layers are naturally selected so that they have no adverse effect on the inventive effect achieved with the three-layer structure according to the invention.

Thus it is also possible to use the three-layer structure of the present invention for producing a 5- or even 7-layered film, depending upon the desired end application.

However, the three-layer structure in accordance with the present invention preferably is employed as such, without lamination to any further film material.

Due to these novel and unique properties of the three-layer films of the invention these structures offer excellent advantages for packaging, preferably flexible packaging, especially for frozen food film.

Thus the three-layer structure according to the present invention is suitable for flexible packaging of food, pharmaceuticals and medical, personal care and cosmetics, and household goods. The food sector consists of many categories—fresh foods, processed foods, frozen foods, baked goods, soups and sauces, savoury snack foods, dairy products, like cheese; tea and coffee, dried foods and confectionery.

Preferred examples of foods for which the three-layer structure according to the present invention can be used are listed below:

fresh fruit and vegetables frozen fruit, vegetables, meat, poultry, and fish products cereals bread and bakery products cheese The films of the invention are particularly applicable for packaging lines where the product is frozen immediately after packaging. The invention is thus of most importance for packaging fruit, vegetables, meat, poultry, and fish which is frozen for both industrial and consumer consumption.

The actual packaging process may be a form, fill and seal (FFS) process, deep draw process or tray lidding process. FFS and deep draw processes are preferred.

FFS involves packaging machines that use heat sealable flexible plastic packaging film to form a package, which is then filled, heat-sealed and cut off. There are two basic types, horizontal and vertical. A horizontal machine forms a package, fills with product and seals, and all in a sequence of operations while the film is being transported in a horizontal direction. They are widely used for packaging solid foodstuffs. A vertical machine forms a tube, fills and seals, all in a sequence of operations while the film is being transported vertically downwards. They are widely used for packaging foodstuffs in a liquid, powder, and paste or granule state.

Thus viewed from one aspect the invention provides a process for packaging fresh products comprising forming an open package using a film comprising the three-layer structure as hereinbefore defined, filling said package with said fresh product, and heat-sealing the package.

The term "fresh product" is intended to cover essentially solid fresh foods that have relatively high levels of liquid content, e.g. water content, blood content or oil/fat content and are wet to the touch or will yield liquid under small amounts of pressure or when cut or pierced. Thus, the term "fresh product" covers fruit and vegetables as well as meat, seafood and certain dairy products, e.g. cheese.

In a deep draw process the film of the invention is deep drawn into a suitable container in which the fresh product is placed. Sealing of the container may be effected by using further film of the invention and sealing as necessary. It is most surprising that the films of the invention are suitable for use in a deep draw process.

EXPERIMENTAL PART

1. Methods

The following methods were used to measure the properties that are defined generally above and in examples below. Unless otherwise stated, the film samples used for the measurements and definitions were prepared as described under the heading "Film Sample Preparation".

Impact resistance on film (DDI) is determined by Dartdrop (g/50%). Dart-drop is measured using ISO 7765-1, method "A". A dart with a 38 mm diameter hemispherical head is dropped from a height of 0.66 m onto a film clamped over a hole. If the specimen fails, the weight of the dart is reduced and if it does not fail the weight is increased. At least 20 specimens are tested. The weight resulting in failure of 50% of the specimens is calculated.

Instrumented puncture test is determined according to ISO 7765-2 (accredited to ISO 17025).

This test method is used for the characterisation of the films under the impact of a striker, with a hemispherical striking surface of diameter 20 mm, applied at a right angle to the plane of the film. The specimens are penetrated normal to the plane by a striker at a nominally uniform velocity (impact velocity used 4.4 m/s). The resulting force-deformation or force-time diagram is electronically recorded.

Temperature −40° C., −20° C. and +23° C.

Tear Resistance (Determined as Elmendori Tear (N)).

The tear strength is measured using the ISO 6383/2 method. The force required to propagate tearing across a film specimen is measured using a pendulum device. The pendulum swings under gravity through an arc, tearing the specimen from pre-cut slit. The specimen is fixed on one side by the pendulum and on the other side by a stationary clamp. The tear strength is the force required to tear the specimen.

Comonomer Content

Quantitative nuclear-magnetic resonance (NMR) spectroscopy was used to quantify the comonomer content of the polymers.

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06}. Standard single-pulse excitation was employed utilising the NOE at short recycle delays {pollard04} and the RS-HEPT decoupling scheme {fillip05}. A total of 1024 (1 k) transients were acquired per spectra.

Quantitative $^{13}C\{^1H\}$ NMR spectra were processed, integrated and relevant quantitative properties determined from the integrals. All chemical shifts are internally referenced to the bulk methylene signal (δ+) at 30.00 ppm.

The amount of ethylene was quantified using the integral of the methylene (δ+) sites at 30.00 ppm accounting for the number of reporting sites per monomer:

$$E=I_{\delta+}/2$$

the presence of isolated comonomer units is corrected for based on the number of isolated comonomer units present:

$$Etotal=E+(3*B+2*H)/2$$

where B and H are defined for their respective comonomers. Correction for consecutive and non-consecutive comonomer incorporation, when present, is undertaken in a similar way.

Characteristic signals corresponding to the incorporation of 1-butene were observed and the comonomer fraction calculated as the fraction of 1-butene in the polymer with respect to all monomer in the polymer:

$$fHtotal=(Htotal/(Etotal+Btotal+Htotal)$$

The amount isolated 1-butene incorporated in EEBEE sequences was quantified using the integral of the *B2 sites at 38.3 ppm accounting for the number of reporting sites per comonomer:

$$B=I*_{*B2}$$

The mole fraction of 1-butene existing as isolated comonomer in the polymer can then be calculated:

$$fB=(B/(Etotal+Btotal+Htotal)$$

With no sites indicative of consecutive incorporation observed the total 1-butene comonomer content was calculated solely on this quantity:

$B\text{total}=B$

Characteristic signals corresponding to the incorporation of 1-hexene were observed and the comonomer fraction calculated as the fraction of 1-hexene in the polymer with respect to all monomer in the polymer:

$fH\text{total}=(H\text{total}/(E\text{total}+B\text{total}+H\text{total})$

The amount isolated 1-hexene incorporated in EEHEE sequences was quantified using the integral of the *B4 sites at 39.9 ppm accounting for the number of reporting sites per comonomer:

$H=I_{*B4}$

The mole fraction of 1-hexene existing as isolated comonomer in the polymer can then be calculated:

$fH=(H/(E\text{total}+B\text{total}+H\text{total})$

With no sites indicative of consecutive incorporation observed the total 1-hexen comonomer content was calculated solely on this quantity:

$H\text{total}=H$

The mole percent comonomer incorporation is calculated from the mole fraction:

$B[\text{mol }\%]=100*fB$ $H[\text{mol }\%]=100*fH$ klimke06
Klimke, K., Parkinson, M., Piel, C., Kaminsky, W., Spiess, H. W., Wilhelm, M., Macromol. Chem. Phys. 2006; 207:382.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
MFR$_2$: ISO1133 at 190° C. at a load of 2.16 kg
MFR$_5$: ISO1133 at 190° C. at a load of 5 kg
MFR$_{21}$: ISO1133 at 190° C. at a load of 21.6 kg Density of the materials is measured according to ISO 1183-1(2004): method A. The test specimens were produced according to ISO 1872-2. The cooling rate of the plaques when crystallising the samples was 15 C/min. Conditioning time was 16 hours at 23° C.

Molecular Weights, Molecular Weight Distribution, Mn, Mw, MWD

Mw/Mn/MWD were measured by GPC according to the following method:

The weight average molecular weight Mw and the molecular weight distribution (MWD=Mw/Mn wherein Mn is the number average molecular weight and Mw is the weight average molecular weight) are measured by a method based on ISO 16014-4:2003. A Waters 150CV plus instrument was used with 3×HT&E styragel column from Waters (divinylbenzene) and trichlorobenzene (TCB) as solvent at 140° C. The column set was calibrated using universal calibration with narrow MWD PS standards (the Mark Howinks constant K: 9.54*10−5 and a: 0.725 for PS, and K: 3.92*10−4 and a: 0.725 for PE). Equipment: Alliance 2000 GPCV (W4410), detector: Refractive index and Visc-detector.

Tensile modulus (0.05-0.25%) is measured according to ISO 527-3 on film samples prepared as described under the Film Sample preparation and in tables with film thickness as given for each test in below Tables 1 and 2 at a cross head speed of 1 mm/min.

Test speed was changed after a deformation of 0.25%.
Specimen type 2 acc. ISO 527-3: stripes with a width of 15 mm and length: 200 mm The following examples illustrate the present invention.

2. Examples

The bimodal terpolymer used in the examples below has been prepared as described in WO 2008/034630 for znLL-DPE 2.

The bimodal terpolymer had the following properties:
MFR$_{21}$: 20 g/10 min; density: 931 kg/m$^3$; butene content: 0.8 mol %; hexene content: 1.6 mol %;

In addition the following materials have been used:
Exceed™ 1018CA (mLLDPE, ethylene-hexene copolymer from ExxonMobil Chemical):
MFR$_2$ (190° C./2.16 kg): 1.0 g/10 min; density: 918 kg/m$^3$
FT5236 (tubular LDPE from Borealis):
MFR$_2$ (190° C./2.16 kg): 0.75 g/10 min; density: 924 kg/m$^3$
FT5230 (tubular LDPE from Borealis)
MFR$_2$ (190° C./2.16 kg): 0.75 g/10 min; density: 923 kg/m$^3$
FB2310 (Bimodal LLDPE copolymer from Borealis)
MFR$_{21}$ (190° C./21.6 kg): 20 g/10 min; density: 931 kg/m$^3$ The following film structures have been prepared:
(xx %, like 25%, mean the percentage of the thickness of the three layer structure each separate layer form)

Comparative Example 1

Outer layer (O-1): 25%: blend of 60 wt % of Exceed™ 1018CA (mLLDPE from ExxonMobil Chemical) and 40 wt % of FT5236 (LDPE from Borealis)
Core layer (C): 50%:100 wt % FT5230 (LDPE from Borealis)
Outer layer (O-2): 25%: blend of 60 wt % of Exceed™ 1018CA (mLLDPE from ExxonMobil Chemical) and 40 wt % of FT5236 (LDPE from Borealis)

Comparative Example 2

Outer layer (O-1): 25%:100 wt % FT5236 (LDPE from Borealis)
Core layer (C): 50%:100 wt % FB2310 (Bimodal LLDPE copolymer from Borealis)
Outer layer (O-2): 25%: blend of 80 wt % of Exceed™ 1018CA (mLLDPE from ExxonMobil Chemical) and 20 wt % of FT5236 (LDPE from Borealis)

Inventive Example 1

Outer layer (O-1): 25%:100 wt % FT5236 (LDPE from Borealis)
Core layer (C): 50%:100 wt % bimodal LLDPE terpolymer as prepared as described in WO 2008/034630 for znLL-DPE 2
Outer layer (O-2): 25%: blend of 80 wt % of Exceed™ 1018CA (mLLDPE from ExxonMobil Chemical and 20 wt % of FT5236 (LDPE from Borealis)

Inventive Example 2

Outer layer (O-1): 25%:100 wt % bimodal LLDPE terpolymer as prepared as described in WO 2008/034630 for znLLDPE 2

Core layer (C): 50%:100 wt % bimodal LLDPE terpolymer as prepared as described in WO 2008/034630 for znLLDPE 2

Outer layer (O-2): 25%: blend of 80 wt % of Exceed™ 1018CA (mLLDPE from ExxonMobil Chemical and 20 wt % of FT5236 (LDPE from Borealis)

Film Sample Preparation

Film Samples were produced by coextrusion on a 3-layer Reifenhauser KG KK4 coextrusion blown film line with die diameter 200 mm, frost line height 3DD at a blow up ratio (BUR) 1:3 and die gap 1.5 mm, without internal bubble cooling.

The extruder comprised three Reifenhauser RT extruders in series with 50 mm diameter and L/D 20-L/D 25-L/D 20.

Extruder temp setting: 210° C. to form 40, 50 and 60 μm 3-layered film with a layer thickness distribution of 25:50:25.

Take off speed was 20 m/min and the roll width was 940 mm

Film samples used and the obtained data are presented in Tables 1 linear low density polyethylene and a low density polyethylene, wherein the amount of metallocene produced linear low density polyethylene is in the range of 50 to 99 wt. % of the total amount of the other outer layer (O-2), and the amount of low density polyethylene is in the range of 1 to 50 wt. % of the total amount of the other outer layer (O-2); wherein the bimodal ethylene-1-butene/$C_6$-$C_{12}$-alpha-olefin terpolymer comprises a low molecular weight fraction of a homopolymer of ethylene and a high molecular weight fraction of a terpolymer of ethylene, 1-butene, and hexene; wherein the bimodal terpolymer has a melt flow rate $MFR_{21}$ according to ISO 1133 (190° C.) of 15 to 45 g/10 min, a density according to ISO 1183 (method A) of 915 to 940 kg/m³, and a comonomer content of 2 to 6% by mol; and wherein the low molecular weight fraction of the bimodal terpolymer has a melt flow index $MFR_2$ according to ISO 1133 (190° C.) of 200 to 800 g/10 min, a density according to ISO 1183 (method A) of 940 to 980 kg/m³, and the amount of the low molecular weight fraction in the bimodal terpolymer is in the range of 30 to 60 wt. %.

2. The multilayer film according to claim 1, wherein the outer layer (O-1) consists of (ii-1) the low density polyethylene, wherein the low density polyethylene is a homopolymer produced in high-pressure polymerization process with a $MFR_2$ according to ISO 1133 (190° C.) of 0.1-20 g/10 min, and a density according to ISO 1183, (method A) of 905-940 kg/m³.

TABLE 1

| Method | Parameter | Unit | Comparative Example 1 | | Comparative Example 2 | | | Example 1 | | | Example 2 | | |
|---|---|---|---|---|---|---|---|---|---|---|---|---|---|
| | | | 60 μm film | 50 μm film | 60 μm film | 50 μm film | 40 μm film | 60 μm film | 50 μm film | 40 μm film | 60 μm film | 50 μm film | 40 μm film |
| Tensile MD | Tensile Modulus | MPa | 176 | 174 | 296 | 305 | 306 | 295 | 303 | 281 | 352 | 372 | 346 |
| Tensile TD | Tensile Modulus | MPa | 211 | 207 | 341 | 346 | 362 | 354 | 366 | 364 | 457 | 452 | 454 |
| Elmendorf MD | Relative tear Resistance | N/mm | 37.66 | 30.26 | 80.71 | 65.99 | 55.58 | 74 | 60.92 | 48.98 | 92.28 | 76.16 | 85.21 |
| Elmendorf TD | Relative tear Resistance | N/mm | 213.69 | 201.85 | 208.45 | 229.74 | 226.11 | 249.19 | 247.21 | 273.64 | 326.72 | 327.62 | 341.49 |
| DDI | F50 | g | 272 | 266 | 340 | 280 | 245 | 626 | 584 | 381 | 578 | 492 | 357 |
| IP(23° C.) | RTPE | J/mm | 12.8 | 13.6 | 15.1 | 15.8 | 15.8 | 27 | 25.1 | 22.9 | 25 | 24.9 | 24.3 |
| IP(−20° C.) | RTPE | J/mm | 10.1 | 9.7 | 14.3 | 13.7 | 15.3 | 16.5 | 16.4 | 16.8 | 20.2 | 21.5 | 20.2 |
| IP(−40° C.) | RTPE | J/mm | 9.9 | 8.0 | 11.2 | 10.7 | 17.8 | 14.5 | 12.5 | 15.4 | 20.6 | 21.4 | 18.4 |

For Comparative Example it was not possible to produce a 40 μm film.
MD machine direction
TD transverse direction
IP(23° C.) Instrumented puncture at +23° C.
IP(−20° C.) Instrumented puncture at −20° C.
IP(−40° C.) Instrumented puncture at −40° C.
RTPE Relate total penetration energy

The invention claimed is:

1. A multilayer film comprising a core layer (C) and two outer layers (O-1, O-2) sandwiching the core layer, wherein (i) the core layer (C) consists of a bimodal ethylene/1-butene/$C_6$-$C_{12}$-alpha-olefin terpolymer and 7 wt. % or less, based on the weight of the core layer (C), of an additives selected from the group consisting of stabilizers, processing aids, colorants, anti-block agents, and slip agents, (ii) one outer layer (O-1) consists of (ii-1) a low density polyethylene or (ii-2) the bimodal terpolymer as defined for the core layer (C); and 7 wt. % or less, based on the weight of the outer layer (O-1), of an additives selected from the group consisting of stabilizers, processing aids, colorants, anti-block agents, and slip agents; and (iii) another outer layer (O-2) comprises (iii-1) a blend of metallocene produced 3. The multilayer film according to claim 1, wherein the outer layer (O-2) comprises (iii-1) the metallocene produced linear low density polyethylene and the low density polyethylene, wherein the metallocene produced linear low density polyethylene is an ethylene/$C_3$-$C_{20}$-alpha-olefin copolymer having a density ISO 1183, (method A) of 905 to 940 kg/m³, and an $MFR_2$ according to ISO 1133 (190° C.) in the range of 0.01 to 20 g/10 min, and the low density polyethylene is a homopolymer produced in high-pressure polymerization process with a $MFR_2$ according to ISO 1133 (190° C.) of 0.1-20 g/10 min, and a density according to ISO 1183, (method A) of 905-940 kg/m³.

4. The multilayer film according to claim 1, wherein the first outer layer (O-1) consists of the low density polyethylene and the other outer layer (O-2) is formed from a blend of the metallocene produced linear low density polyethylene and the low density polyethylene, wherein the metallocene produced linear low density polyethylene is unimodal; or the first outer layer (O-1) consists of the bimodal terpolymer as defined for the core layer (C) and the other outer layer (O-2) is formed from a blend of the metallocene produced linear low density polyethylene and the low density polyethylene, wherein the metallocene produced linear low density polyethylene is unimodal.

5. The multilayer film according to claim 1, wherein the film has a thickness of 10 to 250 microns, whereby the outer layers and core layer are all of equal thickness or each outer layer forms 10 to 35% of the total thickness of the multilayer film and the core layer forms 30 to 80% of the total thickness of the multilayer film.

6. A packaging comprising the multilayer structure of claim 1.

7. The packaging according to claim 6 wherein the multilayer structure is laminated with additional films to produce a 5- or 7-layered film.

8. A process for packaging fresh products selected from the group consisting of fruit and vegetables, meat, poultry fish products, bread and bakery products and cheese comprising forming an open package using the multilayer film of claim 1, filling said package with said fresh product, heat-sealing the package and optionally freezing the packaged product.

* * * * *